No. 644,683.  Patented Mar. 6, 1900.
W. H. PUMPHREY.
SYSTEM OF IGNITION.
(Application filed Mar. 6, 1899.)
(No Model.)  3 Sheets—Sheet 1.
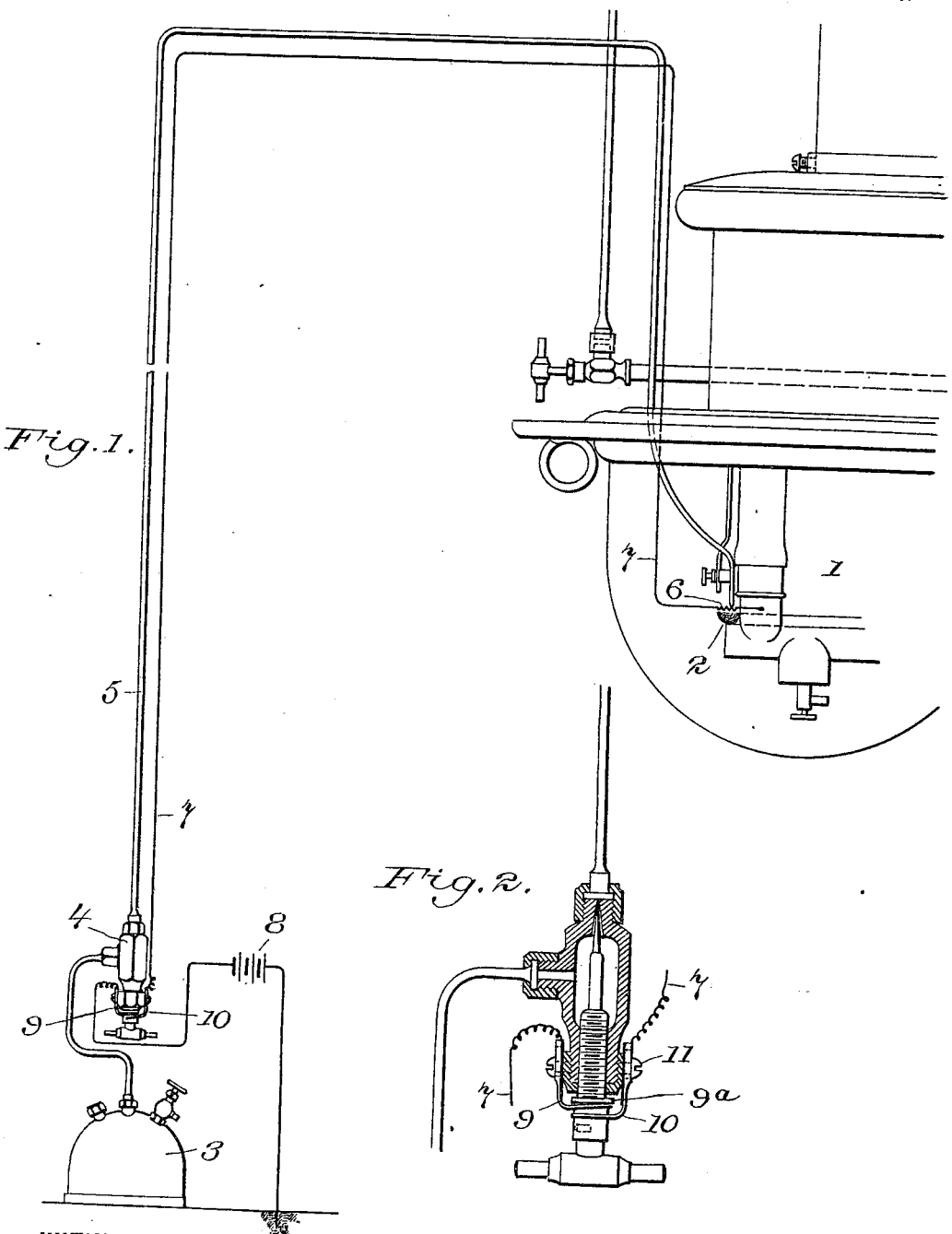
WITNESSES:  INVENTOR.
  Walter H. Pumphrey.
BY
  ATTORNEY.

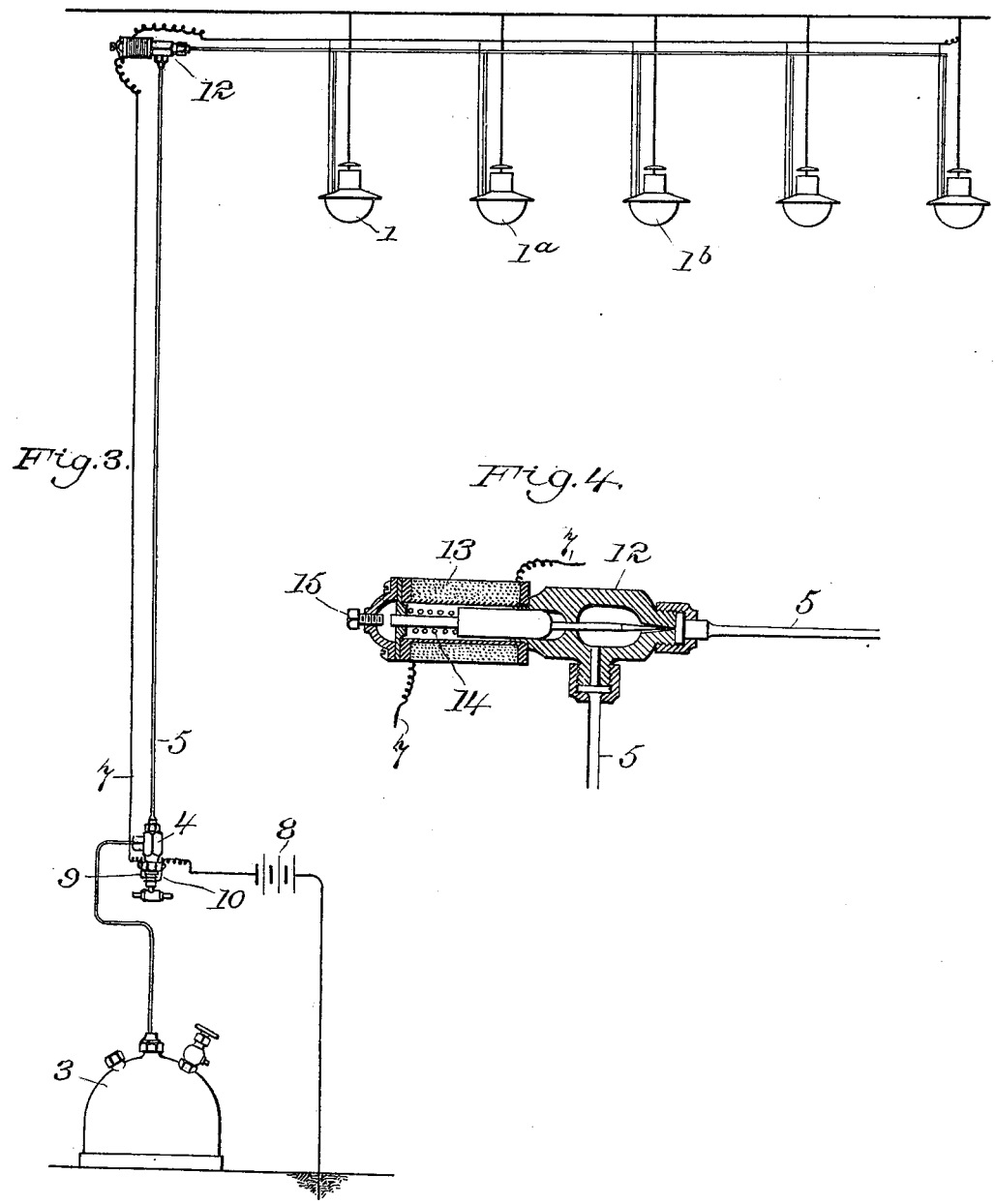

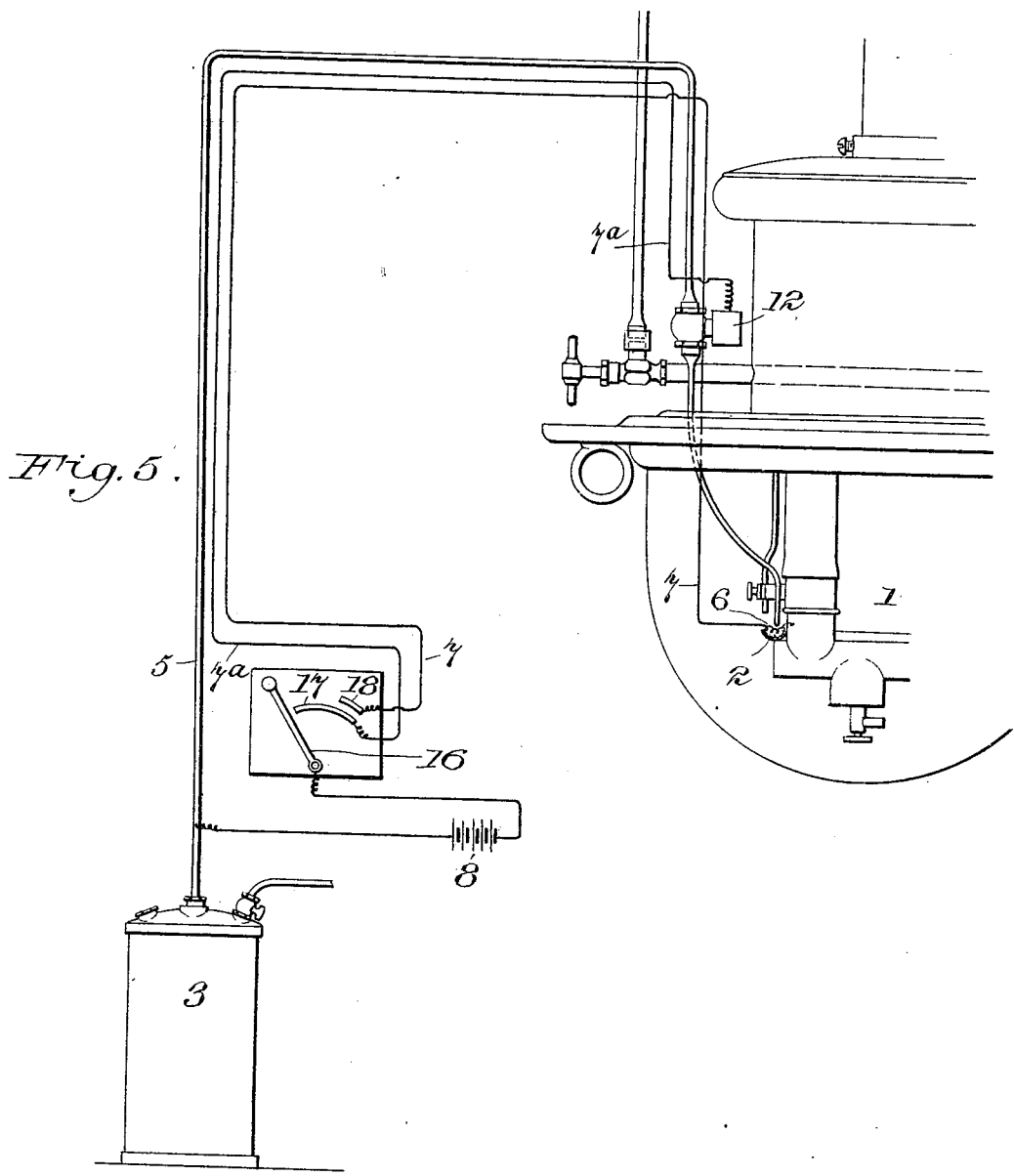

UNITED STATES PATENT OFFICE.

WALTER H. PUMPHREY, OF NEW YORK, N. Y., ASSIGNOR TO THE KITSON HYDROCARBON HEATING AND INCANDESCENT LIGHTING COMPANY, OF PHILADELPHIA, PENNSYLVANIA.

SYSTEM OF IGNITION.

SPECIFICATION forming part of Letters Patent No. 644,683, dated March 6, 1900.

Application filed March 6, 1899. Serial No. 708,016. (No model.)

*To all whom it may concern:*

Be it known that I, WALTER H. PUMPHREY, a citizen of the United States of America, and a resident of New York, county of New York, State of New York, have invented certain new and useful Improvements in Systems of Ignition, of which the following is a specification.

My invention relates generally to vapor-burning apparatus, and is more specifically designed to produce an electrically-operated system of ignition therefor to be employed where the lamps are suspended at points inconvenient of access and where it is not desirable or possible to use gas for producing the preheating of the vaporizing-tube.

The preferred form of my apparatus, with certain modifications, is shown in the accompanying three sheets of drawings, in which—

Figure 1 represents a lamp and electrical means for igniting the alcohol or other inflammable fluid supplied to it for the initial heating. Fig. 2 is a detail sectional view of the combined valve and electrical switch. Fig. 3 is a view of a series of lamps with a modified arrangement of valves including an electrically-operated valve in the connections. Fig. 4 is a detail sectional view of such electrically-operated valve. Fig. 5 is a view showing a still further modified arrangement of electrical connections.

Throughout the drawings like reference-figures refer to like parts.

The vapor-burning lamps are shown in outline at 1 1$^a$ 1$^b$ 1$^c$. Each lamp is provided with a cup 2 for alcohol below the vaporizing-tube. This cup may contain fibrous asbestos or other absorbent incombustible material. A reservoir or tank 3 contains a quantity of alcohol, gasolene, or other highly-inflammable fluid under pressure usually produced by forcing compressed air into the top of the tank. The discharge of fluid from the reservoir is controlled by the valve 4, which when opened permits it to pass through the fine tubing 5 to the alcohol-cup 2. In the alcohol-cup or in operative relation thereto is an electrical igniter 6 of any convenient construction—such, for instance, as a fine coil of platinum wire. This igniter is in the electrical circuit 7, supplied by one or more cells of battery 8 or other source of electric-current supply. I have shown the circuit as being grounded through the lamp, although of course a metallic circuit may be employed, if preferable.

The circuit 7 is controlled by any form of electric switch or circuit-breaker; but I prefer an adjustable spring-switch which may be operated by the valve 4, as shown in Fig. 2, one end of the circuit-wire being connected with the spring-contact 9, controlled by the collar or other projection 9$^a$ from the valve 4, while the other extremity of the circuit terminates in the contact-piece 10, which may be made adjustable by means of the screw 11, passing through a slot formed in said contact-piece.

It is evident that when the valve 4 is open to a certain extent the contact between the parts 9 and 10 will be established and the circuit completed. The degree of opening necessary to produce this can be adjusted by moving the contact-piece 10 up and down and clamping it in the desired position by means of the screw 11, passing through the slot, as shown.

If desirable, one or more electrically-operated valves 12 may be located farther along in the piping system near to the respective lamps or at the point where a series of branch pipes are connected with the main supply-pipe. These electrically-operated valves may be of any desired construction; but I have illustrated a needle-valve, Fig. 4, which will be opened by the solenoid 13 and closed by the expansion of the spring 14 when the current is shut off from the solenoid. The amount of opening possible can be regulated by the set-screw 15. In this construction the electric igniter 6 is in series with the magnet-coils of the solenoid 13, so that the throwing on of the current will simultaneously open the valve 12 and raise the igniter 6 to a white heat.

In the modification shown in Fig. 5 the electrically-operated valve 12 is located on or immediately beside the lamp, and the circuit 7 has a derived circuit 7$^a$, which passes through said valve. These circuits are controlled by the switch 16, coöperating with the contact 17 18.

The mode of operation of the various forms of my invention is as follows:

In the construction shown in Fig. 1 the opening of the valve 4 permits the inflammable fluid to pass in a fine stream through the said needle-valve and pipe 5 to the cup 2, where it is sprayed on the asbestos therein contained. At the same time a full opening of the valve closes the contacts 9 and 10, and the electric current heats the electric igniter 6 to a temperature which will ignite the alcohol or gasolene vaporized from the cup 2, and the flame thus produced heats the vaporizing apparatus of the lamp. When the vaporizing apparatus is at the proper temperature for turning on oil, the alcohol or other inflammable fluid is shut off by closing the valve 4. The same operation breaks the circuit and throws the electric igniter 6 out of operation. It is evident that the inflammable fluid will be fed to the cup only as long as the current is passing through the igniter. The amount of opening necessary to produce the closing of the contacts can be adjusted by adjusting the contact 10, as before described. The same mode of operation occurs in the construction shown in Fig. 3, except that the additional electrically-operated valve 12 is automatically opened when the fluid and current are turned on and closes when they are shut off. This has the advantage of sealing up the larger portion of the alcohol left in the tubing and preventing the same from evaporating through the discharge-opening in the tube or running out by gravity when the igniting apparatus is shut off.

In the construction shown in Fig. 5 the hand-operated valve is dispensed with and the flow of inflammable fluid is entirely controlled by the electrically-operated valve 12. The turning of the switch 16 establishes contact with the contact-piece 17 and first throws the current through the derived circuit 7ª, thereby operating the valve 12 to admit alcohol to the cup 2. Further movement also establishes contact with the contact-piece 18 and sends a portion of the current through the circuit 7, bringing the electrical igniter 6 into operation. When the igniting device is to be turned off, a continued movement of the lever 16 will break both circuits and close the valve 12 and shut off the current from the igniter.

The advantages of my invention reside in the fact that one or any number of lamps may be ignited with the use of alcohol or gasolene with one or two simple movements of an apparatus which is located within easy reach of the operator, thus avoiding the necessity of having the operator climb up on a tall step-ladder to light each one of a number of lamps swung in inaccessible places or being compelled to lower said lamps to produce this initial heating. Furthermore, the system permits the use of only the necessary amount of alcohol—that is to say, the alcohol is fed to the cup as it is burned—and when the vaporizing apparatus is sufficiently heated the alcohol can be shut off immediately, whereas in the present method the cup is filled with alcohol and set fire to and must be allowed to burn out even if the necessary heating is produced before it is half consumed. This method of igniting also saves handling of the lamps and consequent breakage of mantles.

It is evident, of course, that various changes could be made in the details of construction shown without departing from the spirit and scope of my invention. Other forms of electrical switch and other forms of electrically-operated valves, as well as other forms of hand-valve, might be employed. The electrical switch and the valve 4 need not necessarily be operated together. Numerous variations in the electrical circuit shown might evidently be made, but all of these I consider changes of form and still within the scope of my invention.

Having therefore described my invention, what I claim as new, and desire to protect by Letters Patent, is—

1. The combination of a reservoir for inflammable fluid, a cup, connections from the reservoir to the cup, an electric igniter in the cup, a valve, and means controlling the ignition and the flow of the fluid from the reservoir to the cup.

2. The combination of a reservoir for inflammable fluid, a cup, connections from the reservoir to the cup, an electric igniter in the cup, and an electrically-operated valve which controls the flow of fluid from the reservoir to the cup.

3. The combination of a reservoir for inflammable fluid, a cup, connections from the reservoir to the cup, an electric igniter in the cup, and a valve which controls the flow of fluid from the reservoir to the cup, together with an electrical switch controlling said igniter.

4. The combination of a reservoir for inflammable fluid, a cup, connections from the reservoir to the cup, an electric igniter in the cup, and an electrically-operated valve which controls the flow of fluid from the reservoir to the cup, together with an electrical switch controlling said igniter.

5. The combination of a reservoir for inflammable fluid, a cup, connections from the reservoir to the cup, an electric igniter in the cup, and a valve which controls the flow of fluid from the reservoir to the cup, together with an electrical switch controlling said igniter, and mechanism whereby the opening of the valve will close the switch, and the closing of the valve will open the switch.

6. The combination of a reservoir for inflammable fluid, a cup, tubing from the reservoir to the cup, an electric igniter in the cup, a valve which controls the flow of fluid through said tubing, an electromagnet which controls said valve and is in circuit with the igniter, and a switch for opening and closing said circuit.

7. The combination of a reservoir for inflammable fluid, a cup, tubing from the reservoir to the cup, a valve controlling the connection between reservoir and tubing, an electric igniter in operative relation to the cup, a second and electrically-operated valve located in the line of tubing near the lamp, and mechanism whereby an electric current may be sent through said electrically-operated valve and igniter.

8. The combination of a reservoir for inflammable fluid, a cup, tubing from the reservoir to the cup, a valve controlling the connection between reservoir and tubing, an electric igniter in operative relation to the cup, a second and electrically-operated valve located in the line of tubing near the lamp, and mechanism whereby an electric current may be sent through said electrically-operated valve and igniter automatically by the opening of the first-mentioned valve.

9. The combination of a valve, a normally-open electrical switch, and connection mechanism whereby the opening of the valve closes the switch, together with means for adjusting the switch so as to close with varying degrees of valve-opening.

Signed by me at New York city, New York, this 17th day of February, 1899.

WALTER H. PUMPHREY.

Witnesses:
LILIAN FOSTER,
A. PARKER-SMITH.